Dec. 10, 1957  W. L. SCHULTZ  2,815,802
CIRCUMFERENTIALLY DISTRIBUTED THRUST
TYPE TIRE STRIPPING APPARATUS
Filed April 20, 1953
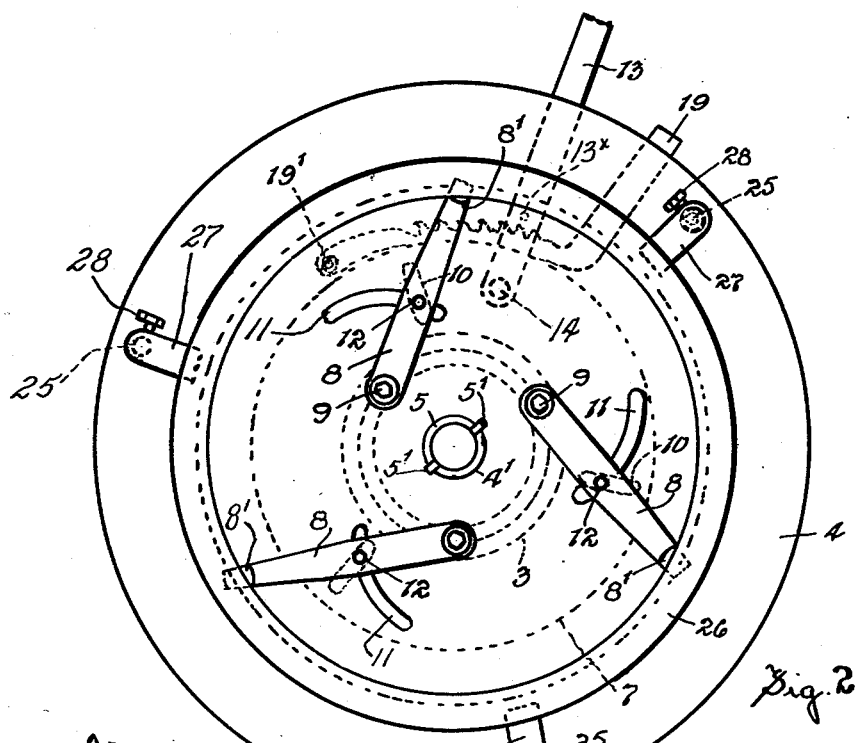
Fig. 2
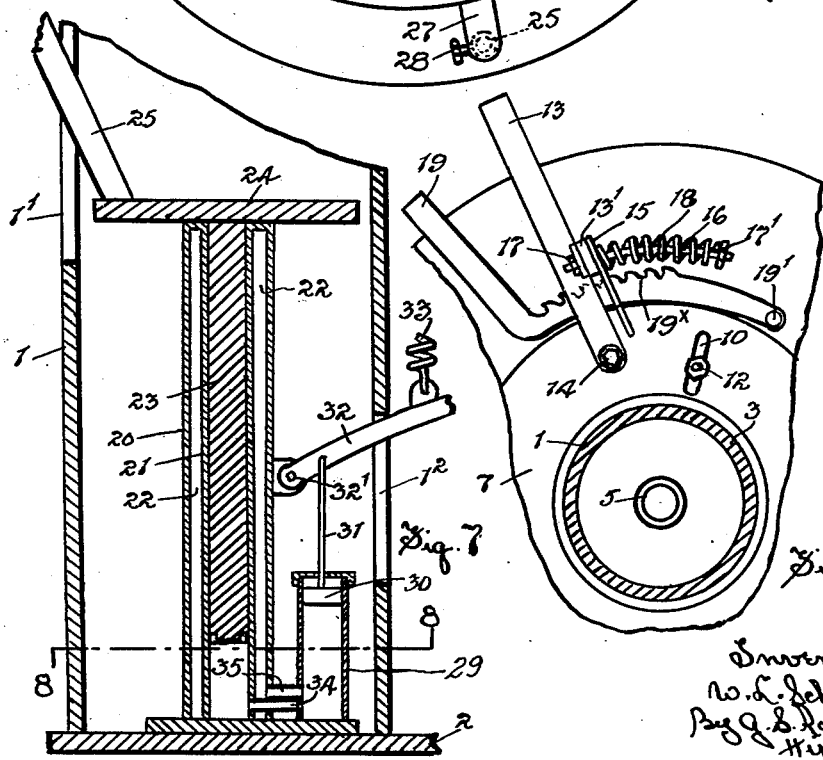
Fig. 7
Fig. 6
Inventor
W. L. Schultz United States Patent Office 2,815,802
Patented Dec. 10, 1957

2,815,802

CIRCUMFERENTIALLY DISTRIBUTED THRUST TYPE TIRE STRIPPING APPARATUS

William L. Schultz, Red Lake Falls, Minn., assignor, by mesne assignments, to Steelman Products Corporation, Red Lake Falls, Minn., a corporation of Minnesota Application April 20, 1953, Serial No. 349,596

2 Claims. (Cl. 157—1.2)

The invention relates to a tire tool and particularly to a garage tool for dismounting and mounting a deflated tire on the rim of a wheel and the principal object of the invention is to supply a tool for breaking the tire bead away from the usual bead retaining flange of the wheel rim and in a manner such that the work can be easily, quickly and positively done with little effort and without damage to the tire during the operation.

A further object is to provide a tire tool for the above purpose wherein the actual work is done by pressure evenly distributed against the side wall of the tire in a location adjacent the bead, such pressure being generated by a hydraulic pump actuated by the attending mechanic.

A further object is to provide a pressure applying ring supporting the wheel with its rim clear of the ring and with its tire, adjacent the tire bead, resting on the ring and to supply controlled hydraulic means for raising the ring and means for stopping the rising of the wheel during the ring lifting movement.

A further object is to provide an arrangement whereby rings of varying diameter can be used to accommodate wheel rims of varying diameter.

A further object is to provide the above objectives embodied in a general purpose tire mounting and dismounting tool, so that the complete work of breaking the beads from their flanges, the dismounting of the tire and the remounting of the same or another tire can be accomplished easily and quickly in an efficient and effective manner.

A further object is to provide a tire tool having an upstanding fixed post, a horizontally disposed ring concentric to and surrounding the post, controlled hydraulic means for raising the ring and a removable stop member associated with the post.

With the above more important objects and other minor objects in view which will become apparent as the description proceeds, the invention consists essentially in the arrangement and construction of parts hereinafter described, reference being had to the accompanying drawings, in which:

Fig. 2 is a plan view thereof.

Fig. 3 is an enlarged vertical sectional view through the lower end of the post and the associated parts.

Fig. 4 is a plan view of the annular stop disc.

Fig. 5 is a detailed view showing a portion of the ring and supporting bracket in vertical section and the upper end of the lifting rod for the bracket.

Fig. 6 is an inverted plan view of a portion of the work table and other associated parts.

Fig. 7 is an enlarged, vertical sectional view centrally through the lower end of the pedestal or stand.

Fig. 8 is a horizontal sectional view at 8—8 of Fig. 7.

Fig. 9 is an enlarged horizontal sectional view through the inner and outer cylinders within the stand and showing the valve and seat in detail.

In the drawings like characters of reference indicate corresponding parts in the several figures.

Figure 1:
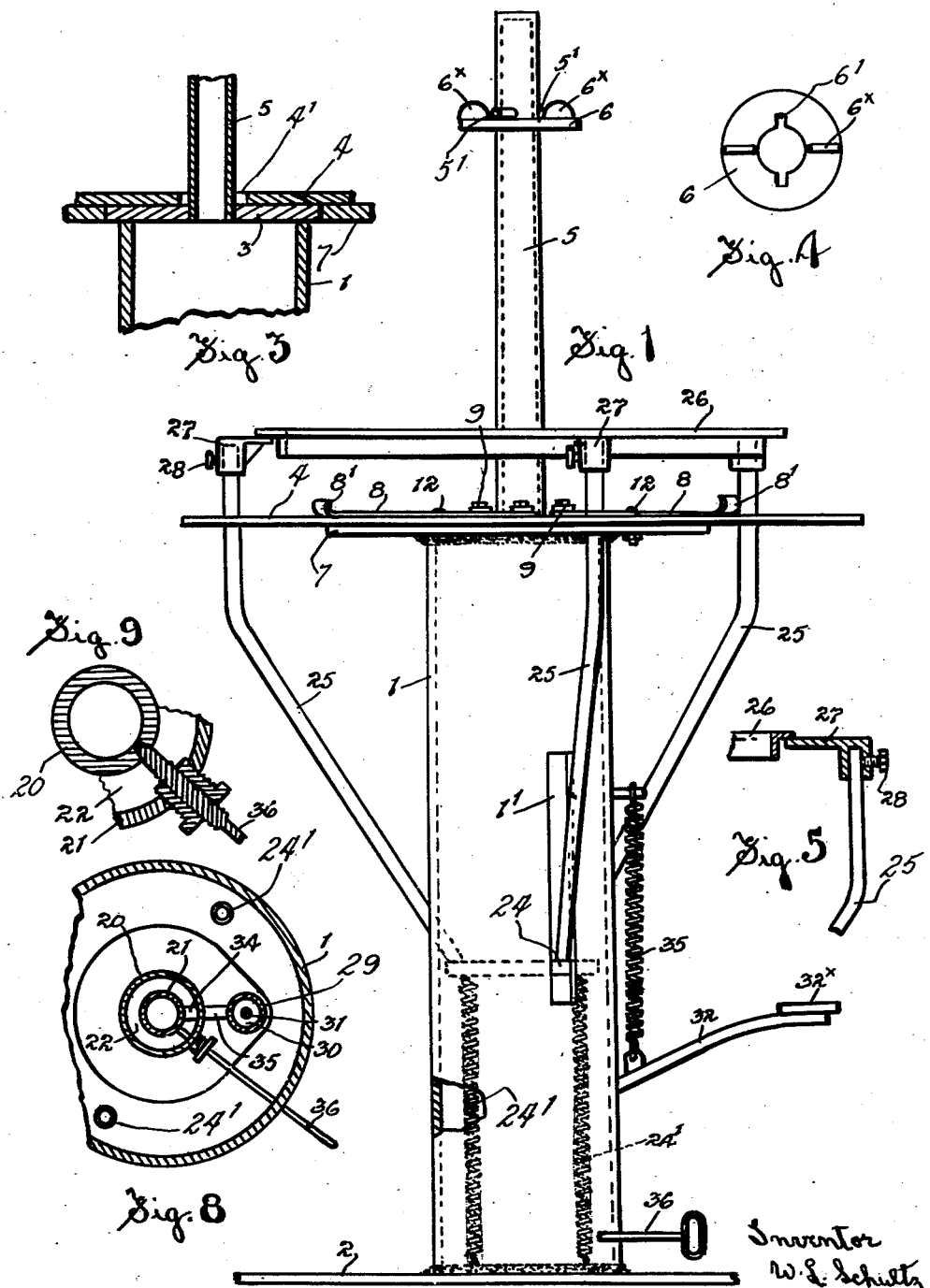
Fig. 1 is a side view of the tire tool.

In carrying out my invention I employ a tubular stand 1 of convenient height which has its lower end permanently secured to a base plate 2 which can be suitably bolted to a floor. The upper end of the stand is closed by a head plate 3 as by welding and on the head plate I mount a circular work table 4 which is centrally apertured at 4' to receive the lower end of an upstanding post 5 which has such lower end permanently welded to the head plate. This post receives slidably a removable stop disc 6 supplied with opposing slots 6' and finger lugs 6$^x$ and the post is supplied in a proper location with diametrically extending pins 5' adapted to pass through the slots so that upon subsequent turning of the post applied disc, the disc becomes stopped against upward travel on the post.

Underneath the table and around the head plate is an annular plate 7 which can be rotated around the head plate as later appearing. On the table I mount a number of pressure bars 8 which are constructed and manipulated in virtually the same way as those shown and described in detail in a co-pending application filed by my brother, Matthew J. Schultz, for a tire tool under Serial Number 306,991 on August 29, 1952, and on such account the details thereof will be only briefly described herein.

Each pressure bar has its outer end supplied with a rim flange gripping jaw 8' and its inner end pivotally secured by a cap screw 9 to the head plate, the cap screw passing through the table. The annular plate 7 is supplied with slots 10 radial to the vertical axis of the pedestal or stand 1 and the table is supplied with similar slots 11 formed concentric to the cap screws 9. Pins 12, permanently carried by the pressure bars, pass downwardly through the slots 11 and 10, and the arrangement is such that upon the annular plate being rotated the jaws 8' are swung outwardly or inwardly depending on the direction of rotation of the annular plate.

The means supplied for rotating the annular plate and for locking the jaws in any desired position is of the same general arrangement as set forth in my brother's application hereinbefore mentioned and comprises the operator's handle 13 pivotally secured by a cap screw 14 to the annular plate and supplied with a downwardly extending lug 13' which is normally engaged with a second lug 15 welded to the annular plate, a bolt 16 passing through the lugs and supplied at its ends with nuts 17 and 17', a compression spring 18 on the bolt between the lug 15 and the nut 17', a locking lever 19 pivotally attached by a cap screw 19' to the underside of the table and provided with a series of teeth 19$^x$ and a pin 13$^x$ carried by the handle and engageable with the teeth and which is identical to and functions for the same purpose as that 15$^x$ shown and described in my brother's application already mentioned.

From the above it will be seen that one can set the jaws as desired to grip the rim of a wheel rested centrally on the table. To do so, one turns the outer end of the handle 13 to the left as appearing in Fig. 2 and assuming that the teeth 19$^x$ are clear of the pin 13$^x$. As the handle is so turned, the lugs 13' and 15 being engaged, cause the annular plate 7 to rotate and such rotation shifts the jaws 8' through the action of the pins 12 and the jaws engage the rim of the wheel. When the jaws have become engaged with the rim, the further turning of the handle causes the spring 18 to become compressed with the result that the jaws are then under heavy pressure. One then pulls the angular end of the locking lever 19 in an outward direction and this swings the toothed part of the handle outwardly to become engaged with the pin 13$^x$, resulting in the locking of the handle in the position in which the spring 18 is compressed, it being understood that the lever 19 pivots on the screw 19'.

The operation of the above mentioned parts is the same as described in the application referred to and as therein explained the lever can be moved and releasably locked in any desired position and when locked will hold the jaws 8' in a set position and when in use under the heavy pressure of the spring 18.

Insofar as my invention is concerned it only differs basically from application 306,991 in that the annular disc and stop pins are supplied for the post, the work table is larger and contains the slots 11 and in that I provide the further parts now described in detail.

Within the lower part of the stand or pedestal 1 and to the base plate 2, I secure permanently an outer cylinder 20 and an inner cylinder 21, spaced to provide an oil reservoir 22 and the inner cylinder receives slidably a piston or plunger 23 the upper end of which has a lifting plate 24 permanently secured thereto and which normally rests, in its down position, on the upper ends of the cylinders 20 being normally forcibly held down by associated springs 24'.

The lifting plate has the lower ends of similar, upgoing, lifting rods 25 secured thereto, positioned 120 degrees apart, and which are spread and pass outwardly through suitable vertical slots 1' provided in the pedestal wall and rise through the work table and terminate thereabove. The upper ends of said rods support a horizontally disposed ring 26 of channel iron cross section utilized to support the tire of an automobile or such like wheel placed thereon. The ring is co-axial to the post. As the overall diameters of the various, existing, tire rims vary considerably, I supply with each tool a number of annular rings 26 having diameters selected to accommodate the various tire rims encountered and in order to permit my device to support such varying diameter rings, I supply the upper ends of the rods 25 with outwardly or inwardly swingable brackets 27 adjustably secured to the rods by jam screws 28. In the drawings, the ring shown is for the standard smaller sized tire rims but it will be obvious that if the brackets 27 be swung outwardly an equal amount, they will support larger rings for use with wheels having larger diameter wheels, such as truck and aeroplane wheels.

Provision is made for hydraulically raising and lowering the ring through pressure built up in and released from the inner cylinder 21 and any suitable means can be used, such as an oil pump supplied with an actuating foot pedal and provided with the necessary leads to and from the said cylinder and the usual check valves.

In the drawing I have shown an oil pump the cylinder 29 of which contains a piston 30, the piston rod of which is connected to a foot pedal 32 which latter has its inner end pivotally connected at 32' to the stand 1. The pedal extends outwardly through a suitable slot 1² provided in the pedestal wall and terminates in a foot pressure plate 32ˣ. A spring 33 holds both the pedal and plunger normally in an up position as shown.

The lower end of the pump cylinder is connected by a passage or tube 34 to the lower end of the inner cylinder 21 and by a second tube or passage 35 to the lower end of the reservoir 22 and a needle valve 36, hand actuated (see Figs. 8 and 9) is supplied to control passage of oil from the lower end of the cylinder 21 to the reservoir 22. Check valves (not shown) are associated with the tubes to prevent passage of oil from the lower end of the pump cylinder 29 to the reservoir 22 through the tube 35 and the passage of oil through the tube 34 from the lower end of the inner cylinder 21 to the lower end of the pump cylinder 29. Such check valves and their functions are so well known that it has not been thought necessary to show them.

In actual use and assuming that there is a quantity of oil in the reservoir and that the valve 36 is in closed position, it will be obvious that the upstroke of the pump piston will draw oil from the reservoir through the pipe or tube 35 into the cylinder 29 and that the subsequent down stroke of the latter piston will discharge that oil into lower end of the cylinder 21 through the tube 34 all of which results in the raising of the ring through the lifting plate and lifting rod connections. When, upon repeated strokes of the pump piston, the ring has been lifted to its desired height to do the work required of it, the valve 36 is opened to permit the oil in the cylinder 21 to escape back into the reservoir, and then the parts resume their original positions.

In order that the invention may be understood I will now explain its use. The wheel rim with its deflated tire is bodily lifted over the post and lowered to rest on the ring 26 which is pre-selected in diameter to accommodate the diameter of the particular wheel, it being understood that the stop disc 6 has been previously removed from the post and that in the wheel lowering operation the post passes through the hub of the wheel. When the wheel is in proper position in regard to the ring, the bead retaining flange of the wheel rim is inside and just clear of the down turned flange of the ring with the result that the exposed side wall of the tire adjacent the bead rests on the horizontal flange of the ring. After so placing the wheel, one applies the stop ring 6 on the post and passes it down to a position below the pins 5' and then gives it, say a half turn, to prevent its subsequent escape upwardly. The pump is then actuated to cause the raising of the ring and as this up movement is continued, the bead of the tire on the then underside is broken away from its rim retaining flange, it being understood that the stop disc is at such time engaged with the hub of the wheel to prevent up movement of the hub and consequently up movement of the rim. It will be noted that in this operation the tire adjacent the bead is subjected to an all around even pressure by a smooth face and cannot be damaged. The under bead having been broken away from the rim flange, one then opens the valve 36 and the parts resume their original positions. The wheel is then lifted off the post, turned upside down, and replaced in relation to the ring, the stop disc is replaced on the post below the pins and turned and the work is again resumed to break the other bead away from its retaining rim flange.

After the tire beads have been so broken away from their retaining rim flanges the final work of removing the tire from the rim can be carried out by removing the ring and clamping the tire securely to the work table with the clamping jaws 8' and then proceeding to use a tire removing tool of the type shown and described in another co-pending application filed by my brother M. J. Schultz and filed under Serial Number 306,992 for tire mounting and dismounting tools on August 29, 1952, and later abandoned and this same tool can be used as explained in his specification to remount that tire or another one on the rim with the latter clamped to the work table.

What I claim as my invention is:

1. In a tool for breaking the bead of a deflated tire away from the retaining flange of a wheel rim, an upstanding, fixed hollow pedestal, a horizontally disposed work table permanently mounted on the upper end of the pedestal, a ring above the table to engage the side wall of the tire adjacent the tire bead and with the wheel rim flange immediately to the innerside of the ring, a fixed post extending upwardly from the table and co-axial with the ring and adapted to be passed through the wheel hub, a member associated with the post and engageable with the hub of the wheel to prevent raising of the same a cylinder and plunger housed within the lower part of the pedestal, a lifting plate secured to the upper end of the plunger, spaced lifting rods secured to the plate and passing outwardly and upwardly through vertical slots provided in the pedestal wall and having their upper ends secured to the ring and a hydraulic pump connected to the cylinder for actuating the plunger.

2. In apparatus for breaking the bead of a tire away from the flange of a wheel rim, a base, an upright post mounted on the base for receiving the wheel rim therearound in horizontal position, means restricting upward movement of the wheel rim with respect to the post, a plurality of generally upright lifting rods spaced from the post and from each other circumferentially around the post, said rods having upper and lower end portions, fixed guiding means on the base and guiding the upright rods in vertical movement, vertically projectible and retractable drive means on the base and connected with the lower ends of said rods, a tire-engaging ring of slightly greater diameter than the flange of the rim from which the tire is to be broken, and adjustable connections connected with the upper ends of said rods and engaging said ring in supporting relation, said adjustable connections being constructed and arranged to facilitate supporting of different sized rings from the upper ends of the rods which are vertically guided in fixed relation to the post, whereby to accommodate rims of different sizes for breaking the tire beads therefrom.

References Cited in the file of this patent

UNITED STATES PATENTS

| | | |
|---|---|---|
| 1,352,722 | Caldwell | Sept. 14, 1920 |
| 1,959,655 | Brouhard | May 22, 1934 |
| 2,034,819 | Maulis | Mar. 24, 1936 |
| 2,464,638 | Falkner | Mar. 15, 1949 |
| 2,534,594 | Haecker | Dec. 19, 1950 |
| 2,538,759 | Briggs | Jan. 23, 1951 |
| 2,566,315 | Christofoli et al. | Sept. 4, 1951 |

FOREIGN PATENTS

| | | |
|---|---|---|
| 549,505 | Great Britain | Nov. 12, 1947 |